Figure 1:
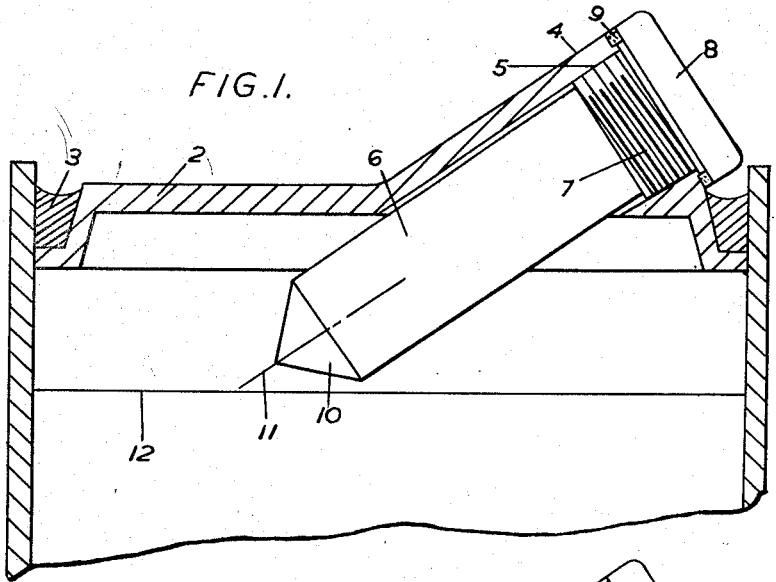

Jan. 5, 1954    J. R. MARTIN    2,665,327
ELECTROLYTE LEVEL INDICATION IN ELECTRICAL ACCUMULATORS
Filed Jan. 15, 1951    3 Sheets-Sheet 1

Inventor
John R. Martin
By
Attorney

Jan. 5, 1954 J. R. MARTIN 2,665,327
ELECTROLYTE LEVEL INDICATION IN ELECTRICAL ACCUMULATORS
Filed Jan. 15, 1951 3 Sheets-Sheet 2

Inventor
John R. Martin
By
Attorney

Patented Jan. 5, 1954

2,665,327

UNITED STATES PATENT OFFICE 2,665,327

ELECTROLYTE LEVEL INDICATION IN ELECTRICAL ACCUMULATORS

John Ronald Martin, Denton, near Manchester, England, assignor to Oldham & Son Limited, Denton, near Manchester, England, a British company Application January 15, 1951, Serial No. 206,026

Claims priority, application Great Britain February 7, 1950

8 Claims. (Cl. 136—182)

This invention relates to level indicators for use in electrical accumulators and has for its main object to conveniently present a clearly defined indication of the level of the electrolyte to a person in the act of filling or topping the accumulator and thereby tends to prevent overtopping.

Another main object is to provide a level indicator which shows the level in accumulators designed to be filled from one side.

A further object is to provide an indicator which shows when the electrolyte is at, above or below the correct working level.

An electrical accumulator constructed according to the present invention is characterised by an electrolyte level indicator which can be examined from the side of the accumulator, in which indicator is seen an image above the level of the liquid of a submerged area of a level indicator.

In the use of such apparatus the viewer can always see a bright image, being fully illuminated by light reaching the submerged areas as the viewer's head or body does not obturate the flow of light to the said area.

One practical embodiment of an accumulator according to the invention is characterised by a cylindrical transparent element having a conical inner end, the cone angle being substantially 45°, the element being mounted on the accumulator so that its axis is inclined to the horizontal and the inner end intersects the horizontal plane at the intended level of the liquid, a portion of the surface of the conical part being below the level of the apex, the inclination of the element being less than 45° and such that an image of the projected area of immersion, occurring on the underside of the conical end, is produced on the upper side of the conical end, the image apparently merging across the apex with the picture of the area immersed presented to the viewer.

According to another aspect of the invention, an electrical accumulator has an electrolyte level indicator disposed to be viewed from one side of the accumulator, comprising a cylindrical element adapted to transmit light in the axial direction and having a transparent conical part at the inner end of the member, the cone angle being substantially 45°, the apex of the conical part lying approximately in the plane of the intended level of the liquid in the accumulator and in the axis of the cylindrical member, a portion of the surface of the conical part being below the level of the apex, the inclination to the horizontal of the axis of the member being less than 45° and such that an observer looking down the member sees on a light background a dark picture of the immersed area of the conical surface and a dark image of that area on the upper side of the conical part.

The cylindrical element may be a solid transparent rod having a solid conical part integral thereof at the end thereof; or it may be a cylindrical tube having at the end thereof a solid transparent conical part. In the latter case, the cylindrical tube and conical part may be formed in one piece from transparent material or may be made in separate pieces and secured together.

The rod may be extended through the cover of the accumulator as a tube and the tube may be metallised on the inner surface to form a light reflecting surface. Preferably however the rod extends above the cover of the accumulator and has a plane outer end inclined from the vertical presenting an image finder facing the said side of the accumulator.

Experiments have shown that the light transmitted wholly through a solid transparent rod gives a more clearly defined image than if the rod terminates at the foot of a coaxial tubular portion so that the top of the solid part is within the accumulator.

The present invention also comprises an accumulator having a solid transparent rod extending through the cover so that the plane outer end thereof which is inclined from the vertical is immediately above the cover, and a filler opening, the mouth of which is in a plane which is parallel to and near to the plane of the outer end of the rod so that a person can view the image during the operation of filling or topping the accumulator.

As the liquid level rises in the accumulator and commences to submerge the conical end of the obliquely disposed transparent rod, the area of the underside of the conical end in contact with the liquid ceases to be a total light reflecting surface and in contrast with the rest of the surface presents a dark appearance and the image of the projected area submerged is clearly defined on the upper side of the conical and above the liquid level and is readily viewed from the side of the accumulator. By locating the apex of the cone at the correct working level of the electrolyte, the meeting of the apices of the dark area and of its image indicates that the electrolyte is at the correct level.

Figure 2:
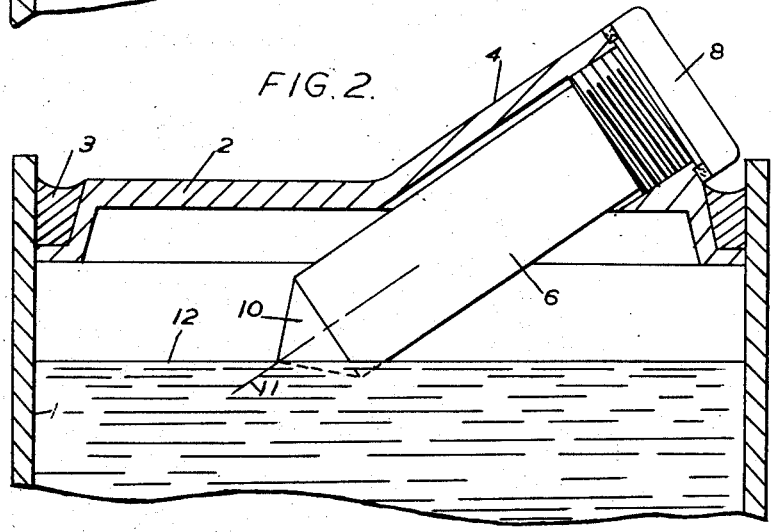
Figure 3:
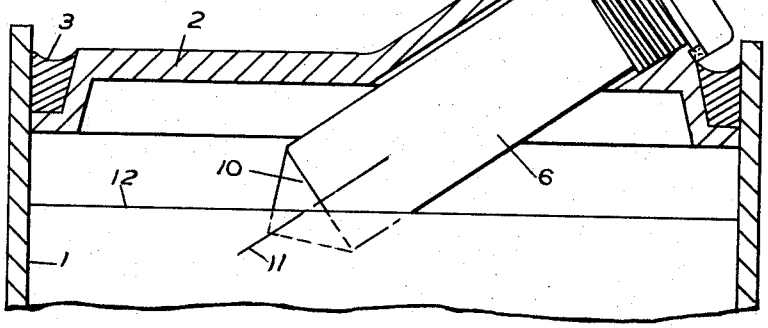
Figure 4:
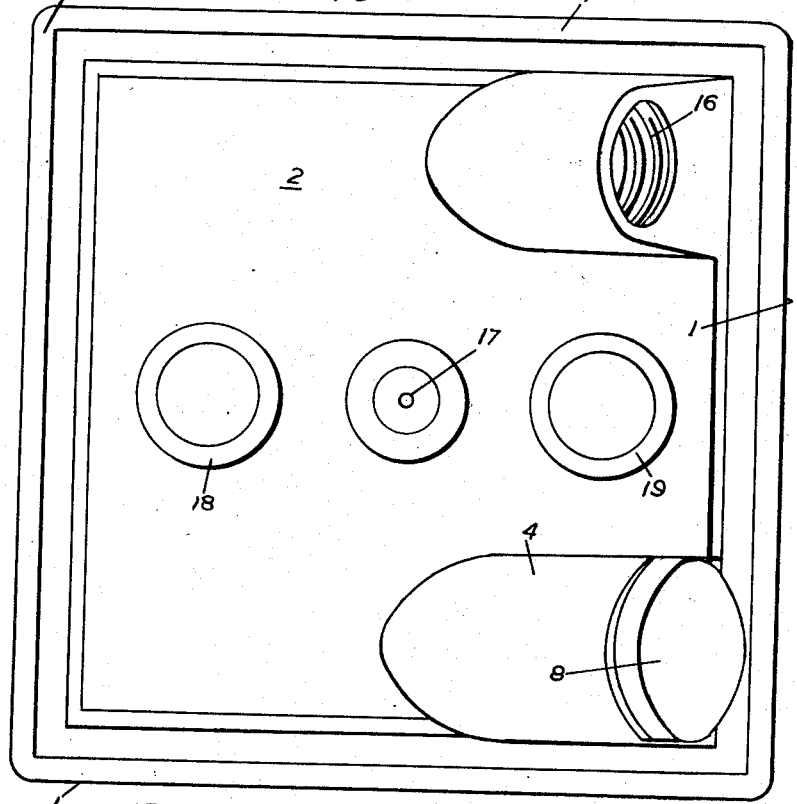
Figure 3A:
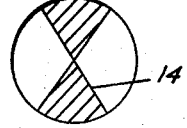
Figure 4A:
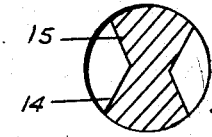
Figure 5:
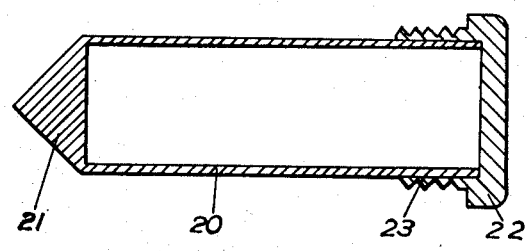
Figure 6:
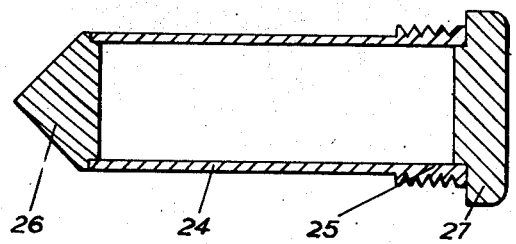

In order that the invention may be more clearly understood preferred modifications thereof as applied to accumulators designed to be filled from the side will be described, by way of example, with reference to the accompanying diagrammatic drawings, in which:

Figure 1 shows in sectional elevation taken on the line 1—1 of Figure 4 the obliquely disposed level indicator, Figures 2 and 3 are views similar to Figure 1 showing different levels of liquid whilst Figures 1A, 2A, 3A and 4A indicate what is seen by a viewer looking into the outer end of the inclined rod as he is filling the accumulator, Figure 4 is a plan view of the accumulator showing the filler opening facing the same side of the accumulator as the outer end of the rod, Figure 5 is a central section through a modified level indicator, and Figure 6 is a central section through a further modification of the level indicator.

In the drawings, like references designate the same parts.

The accumulator casing comprises in known manner integral bottom and side walls of which only the side walls 1 are illustrated, and a cover 2 sealed to the walls 1 by a gasket 3. The cover 2 is formed with an obliquely disposed mouth 4 within which screw threads 5 are formed and into which engages a transparent rod 6 having an interengaging threaded portion 7 by which the rod is mounted in the cover in an oblique position preferably so that the axis is disposed at about 30° to the horizontal.

The outer end 8 of the rod forms a head thereto against which is sealed a gasket 9 which, as the rod is screwed tightly into position, seals the mouth 4. The exposed face of the outer end 8 is plane and is accordingly disposed at about 30° from the vertical and forms an image finder easily viewed from the side of the accumulator. The inner end 10 of the rod is conical and the apex lies in the axis 11 of the rod. The cone angle is substantially 45° as shown.

The rod may be made of glass or of a transparent industrial plastic, e. g. "Perspex," inert to the electrolyte, the level of which is indicated at 12. By making the rod readily removable it can be readily maintained clean as a light reflecting element.

In place of the rod 6, a tubular member may be used. In Figure 5, the indicator is a hollow cylinder 20 terminating in an integral solid conical part 21 coaxial with the cylinder. The open end of the hollow cylinder 20 is closed by the cap 22 which is a push fit on the outside of the cylinder and is externally threaded at 23 to engage with the threads 5 of mouth 4 of the accumulator. The cylinder 20, integral conical part 21 and cap 22 are made from a transparent plastic material, inert to the electrolyte, such as methyl methacrylate polymer.

In another form (Figure 6), the indicator comprises a tube 24 threaded externally at one end 25 and having secured at the other end a separate solid conical part 26. The open end of the tube 24 is closed by cap 27 which is a push fit within the end of the tube. The conical part 26 and cap 27 are all formed from transparent plastic and the tube 24 may be made of the same material or of an opaque material such as that sold under the trade mark "Bakelite."

Figure 1A:
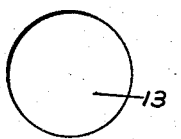
Figure 2A:
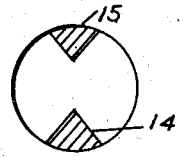

Before the electrolyte level 12 reaches the indicator as shown in Figure 1A, light passes down the indicator axially, undergoes total internal reflection twice on the conical surface and returns up the tube. An observer looking down the indicator therefore sees a light circle as indicated by the circle 13 of Figure 1A. When the level 12 rises towards that shown in Figure 2 to submerge the end faces of the conical end, light striking the submerged area is not totally internally reflected but is transmitted into the electrolyte; this applies to light that has been previously reflected from a non submerged part of the conical surface as well as to light passing axially down the indicator and striking directly the submerged surface. The observer will then see a dark segment-shaped picture diagrammatically indicated by the triangle 14 in Figure 2A and a second dark segment-shaped picture indicated by the triangle 15 and appearing as a mirror image of the first picture. These dark areas are seen against the light background formed by the double reflection of light striking unsubmerged parts of the conical surface. When level 12 reaches that shown in Figure 2 the apices of the dark area 14 and of the image 15 meet as shown in Figure 3A, thus indicating that the correct level has been reached. If the level 12 rises still as further indicated in Figure 3, then the darkened area and the mirror image merge as indicated in Figure 4A.

As clearly shown in Figure 4, the accumulator is provided with the level indicator at one corner and with a filler opening 16, also obliquely inclined, at the other corner of the same side of the accumulator, thus it will be seen that an operator filling the accumulator from the side is readily and clearly informed by the image finder 8 of the level in the accumulator at any time during the filling operation.

By the present invention overtopping can be eliminated.

The cover 2 as shown in Figure 4 comprises an air vent 17 whilst at 18 and 19 are indicated the usual positive and negative electrodes of the accumulator.

What I claim is:

1. An electrical accumulator comprising a cylindrical transparent element mounted within the accumulator with its outer end visible from the exterior of the accumulator and with its axis inclined at an angle less than 45° to the horizontal, said element having a conical inner end coaxial therewith, the cone angle being substantially 45°, the apex of the conical inner end being disposed at the intended level of the liquid and a portion of the surface of the conical end being located below the level of the apex, whereby an image of the projected area of immersion, occurring on the underside of the conical end, is produced on the upper side of the conical end, the image apparently merging across the apex with the picture of the area immersed presented to the viewer.

2. An electrical accumulator provided with an electrolyte level indicator comprising an accumulator casing, a cylindrical element for transmitting light in the axial direction disposed within said casing at an angle less than 45° to the horizontal and having its upper end visible from the exterior of said casing, and a transparent conical part at the inner end of said element with the apex thereof at the desired electrolyte level the cone angle being substantially 45° and, a portion of the surface of the conical part being below the level of the apex, whereby light passing down said element except that striking a part of the conical surface submerged in the electrolyte is totally internally reflected back up the element, so that an observer looking down the element sees on a light background a dark picture of the immersed area of the conical surface and a dark image of that area on the upper side of the conical part.

3. An electrical accumulator provided with an electrolyte level indicator comprising an accumulator casing with an inclined circular mouth in the top thereof, a cylindrical element for transmitting light in the axial direction disposed in said mouth and projecting into said casing at an angle less than 45° to the horizontal, and a transparent conical part at the inner end of said element and coaxial therewith the cone angle being substantially 45° and, said part having a portion of its surface located below the level of the apex thereof, which apex is at the desired electrolyte level, whereby light passing down said element except that striking a part of the conical surface submerged in the electrolyte is totally internally reflected back up the element, so that an observer looking down the element sees on a light background a dark picture of the immersed area of the conical surface and a dark image of that area on the upper side of the conical part.

4. An electrical accumulator provided with an electrolyte level indicator comprising an accumulator casing with an inclined circular mouth therein, a solid transparent rod in said mouth and projecting into said casing at an angle less than 45° to the horizontal, an integral transparent conical part at the inner end of said rod and coaxial therewith the cone angle being substantially 45° and, said part having a portion of its surface located below the level of the apex thereof, which apex is at the desired electrolyte level, whereby light passing down said rod except that striking a part of the conical surface submerged in the electrolyte is totally internally reflected back up said rod, so that an observer looking down said rod sees on a light background a dark picture of the immersed area of the conical surface and a dark image of that area on the upper side of the conical part.

5. An electrical accumulator provided with an electrolyte level indicator comprising an accumulator casing with an inclined circular mouth therein, a transparent tube in said mouth and projecting into said casing at an angle less than 45° to the horizontal, an integral transparent conical part at the inner end of said tube and coaxial therewith, the cone angle being substantially 45° and said part having a portion of its surface located below the level of the apex thereof, which apex is at the desired electrolyte level, whereby light passing down said tube except that striking a part of the conical surface submerged in the electrolyte is reflected back up said tube, so that an observer looking down said tube sees on a light background a dark picture of the immersed area of the conical surface and a dark image of that area on the upper side of the conical part.

6. An electrical accumulator provided with an electrolyte level indicator comprising an accumulator casing with an inclined circular mouth therein, a transparent cylindrical tube in said mouth and projecting into said casing at an angle less than 45° to the horizontal, a transparent conical member secured at the inner end of said tube and coaxial therewith, the cone angle being substantially 45° and said part having a portion of its surface located below the level of the apex thereof, which apex is at the desired electrolyte level in said casing, and a transparent closuring cap for the outer end of said tube, whereby light passing down said tube except that striking a part of the conical surface submerged in the electrolyte is reflected back up said tube, so that an observer looking down said tube sees on a light background a dark picture of the immersed area of the conical surface and a dark image of that area on the upper side of the conical part.

7. An electrical accumulator provided with an electrolyte level indicator comprising an accumulator casing with two parallel inclined circular mouths therein, closely spaced together, their faces lying in a plane inclined to the horizontal, a cylindrical element for transmitting light in the axial direction disposed in one of the said mouths at an angle less than 45° to the horizontal and having a plane outer end, which is inclined from the vertical immediately above the casing, a transparent conical part at the inner end of said cylindrical element and co-axial therewith, said conical part having a cone angle of substantially 45° and a portion of its surface located below the level of the apex thereof, which apex is at the desired electrolyte level, the other of said mouths constituting a filler opening whereby a person can view the image in the electrolyte indicator during the operation of filling or topping the accumulator.

8. An electrical accumulator provided with an electrolyte level indicator comprising an accumulator casing, a cylindrical element for transmitting light in the axial direction disposed within said casing at an angle of approximately 30° to the horizontal and having its upper end visible from the exterior of said casing, and a transparent conical part at the inner end of said element with the apex thereof at the desired electrolyte level, the cone angle being substantially 45° and a portion of the surface of the conical part being below the level of the apex, whereby an image of the projected area of immersion of the underside of the conical part is produced on the upper side of the conical part.

JOHN RONALD MARTIN.

References Cited in the file of this patent

UNITED STATES PATENTS

| Number | Name | Date |
|---|---|---|
| 461,370 | Seidensticker | Oct. 13, 1891 |
| 1,136,075 | Whitney | Apr. 20, 1915 |
| 1,883,971 | Kryzanowsky | Oct. 25, 1932 |
| 2,021,288 | Carlile | Nov. 19, 1935 |
| 2,123,479 | Spencer | July 12, 1938 |
| 2,301,460 | Sauer | Nov. 10, 1942 |
| 2,368,705 | Du Pont et al. | Feb. 6, 1945 |
| 2,468,833 | Murphy | May 3, 1949 |
| 2,548,558 | Raney | Apr. 10, 1951 |
| 2,554,557 | Brown et al. | May 29, 1951 |

FOREIGN PATENTS

| Number | Country | Date |
|---|---|---|
| 412,803 | Great Britain | July 5, 1934 |
| 872,958 | France | June 25, 1942 |
| 587,066 | Great Britain | Apr. 11, 1947 |

OTHER REFERENCES

Publication: Railway Mechanical Engineer, October 1949, pages 588–589.